US010570936B2

(12) United States Patent
Hussey (10) Patent No.: US 10,570,936 B2
(45) Date of Patent: Feb. 25, 2020

(54) SYMMETRICALLY LOADED DUAL HYDRAULIC FLY-BY-WIRE ACTUATOR

(71) Applicant: Parker Hannifin Corporation, Cleveland, OH (US)

(72) Inventor: David Hussey, Trabuco Canyon, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 1142 days.

(21) Appl. No.: 14/631,155

(22) Filed: Feb. 25, 2015

(65) Prior Publication Data

US 2016/0052620 A1 Feb. 25, 2016
US 2018/0079491 A9 Mar. 22, 2018

Related U.S. Application Data

(60) Provisional application No. 62/040,032, filed on Aug. 21, 2014, provisional application No. 61/949,270, filed on Mar. 7, 2014.

(51) Int. Cl.
*F15B 20/00* (2006.01)
*B64C 13/40* (2006.01)
*B64C 13/50* (2006.01)

(52) U.S. Cl.
CPC ............. *F15B 20/00* (2013.01); *B64C 13/40* (2013.01); *B64C 13/503* (2013.01); *F15B 2211/20576* (2013.01); *F15B 2211/7107* (2013.01); *F15B 2211/7128* (2013.01); *F15B 2211/8757* (2013.01)

(58) Field of Classification Search
CPC .. B64C 13/42; B64C 9/16; B64C 9/18; B64C 9/20; B64C 9/28; B64C 9/32; B64C 9/323; B64C 9/22; B64C 9/24; B64C 9/26; B64C 2009/005; F15B 11/16; F15B 13/10
See application file for complete search history.

(56) References Cited

U.S. PATENT DOCUMENTS 3,242,822 A * 3/1966 Barltrop .................. B64C 13/00
91/173
3,272,090 A * 9/1966 Ellis ........................ B64C 13/00
244/194

(Continued)

FOREIGN PATENT DOCUMENTS

FR 2 768 697 9/1997

*Primary Examiner* — Jessica B Wong
(74) *Attorney, Agent, or Firm* — Renner, Otto, Boisselle & Sklar, LLP (57) ABSTRACT

An actuation system for resolving the effects of force-fight between multiple stages within an actuator coupled to an aircraft flight control member includes a yoke configured for connection to the flight control member. A first control member is operatively coupled to a first actuator and configured to cause the first actuator to output a first force to the yoke, and a second control member is operatively coupled to a second actuator and a third actuator symmetrically arranged on opposite sides of the first actuator. The second control member is configured to operate independent of the first control member and to cause the second actuator and the third actuator to output a second force to the yoke and a third force to the yoke respectively, wherein the combined force is substantially the same as the first force to effect motion of the flight control member.

21 Claims, 4 Drawing Sheets

(56) References Cited

U.S. PATENT DOCUMENTS

| | | | | |
|---|---|---|---|---|
| 3,426,650 A * | 2/1969 | Jenney | ............... | F15B 18/00 244/194 |
| 3,530,767 A * | 9/1970 | Shook | ............... | F15B 11/16 414/694 |
| 3,566,748 A * | 3/1971 | Mahler | ............... | B64C 13/42 91/523 |
| 3,593,620 A * | 7/1971 | Foerster | ............... | B64C 13/42 91/510 |
| 3,792,643 A * | 2/1974 | Scheafer | ............... | F15B 11/16 60/425 |
| 3,824,896 A * | 7/1974 | Tull, III | ............... | B28B 11/14 91/404 |
| 3,884,127 A * | 5/1975 | Simmons | ............... | B64C 13/42 91/509 |
| 4,447,769 A * | 5/1984 | Corney | ............... | G05B 9/03 244/194 |
| 4,449,446 A * | 5/1984 | Degnan | ............... | B64C 13/36 89/36.02 |
| 4,699,043 A * | 10/1987 | Violante De Dionigi | ............... | B64C 27/64 91/182 |
| 4,759,515 A | 7/1988 | Carl | | |
| 5,493,497 A * | 2/1996 | Buus | ............... | B64C 13/503 244/194 |
| 5,701,801 A * | 12/1997 | Boehringer | ............... | F15B 20/00 92/166 |
| 6,241,182 B1 * | 6/2001 | Durandeau | ............... | B64C 13/42 244/227 |
| 6,651,930 B1 | 11/2003 | Gautier et al. | | |
| 6,685,138 B1 * | 2/2004 | Krantz | ............... | B64C 13/40 244/226 |
| 6,704,624 B2 | 3/2004 | Ortega et al. | | |
| 6,860,452 B2 * | 3/2005 | Bacon | ............... | G05D 1/0077 244/194 |
| 7,631,840 B2 * | 12/2009 | Kallinen | ............... | B64C 9/02 244/123.1 |
| 8,070,091 B2 * | 12/2011 | Benson | ............... | B64C 27/605 244/17.13 |
| 8,126,592 B2 * | 2/2012 | Saunders | ............... | B25J 9/144 700/245 |
| 8,235,328 B2 * | 8/2012 | Hirvonen | ............... | B64C 13/42 244/194 |
| 2007/0295120 A1 * | 12/2007 | Gerbier | ............... | B64C 13/42 74/25 |
| 2012/0006939 A1 * | 1/2012 | Parker | ............... | F15B 15/1404 244/99.5 |
| 2012/0181382 A1 * | 7/2012 | Ito | ............... | F15B 11/0365 244/99.3 |
| 2012/0253556 A1 * | 10/2012 | Noll | ............... | B64C 13/503 701/3 |
| 2012/0259483 A1 * | 10/2012 | Villano | ............... | B64C 13/42 701/3 |
| 2012/0305701 A1 | 12/2012 | Ito | | |
| 2014/0175216 A1 * | 6/2014 | Ishihara | ............... | B64C 9/02 244/99.3 |
| 2015/0041278 A1 * | 2/2015 | Naubert | ............... | F16D 11/12 192/85.63 |

* cited by examiner

SYMMETRICALLY LOADED DUAL HYDRAULIC FLY-BY-WIRE ACTUATOR

RELATED APPLICATION DATA

This application claims the priority of U.S. Provisional Application No. 61/949,270, filed on Mar. 7, 2014, and U.S. Provisional Application No. 62/040,032, filed on Aug. 21, 2014, each of which is hereby incorporated in its entirety by reference.

TECHNICAL FIELD

The present disclosure relates generally to fly by wire flight control actuation and, more particularly, to an apparatus and method that minimizes bending moments due to force-fighting between redundant actuators in aircraft flight actuator systems.

BACKGROUND

Aircraft typically include a plurality of flight control surfaces (fixed wing aircraft) or one or more cyclic pitch control swashplates (rotary wing aircraft) that, when controllably positioned, guide the movement of the aircraft from one destination to another. The number and type of flight control surfaces or swashplates included in an aircraft may vary.

The positions of the aircraft flight control surfaces or swashplates are typically controlled using a flight control actuation system. The flight control actuation system, in response to position commands that originate from either the flight crew or an aircraft autopilot, moves the aircraft flight control surfaces or swashplate(s) to the commanded positions. In most instances, this movement is effected via actuators that are coupled to the flight control surfaces or swashplate(s). Though unlikely, it is possible that a flight control surface actuator could become jammed, uncontrollably free, or otherwise inoperable. Thus, some flight control surface actuation systems are implemented with redundant actuators.

Redundant flight control actuators that have two hydraulic systems typically implement one of two operational configurations—an active-standby configuration or an active-active configuration. With the active-standby configuration, one actuator is actively powered while the other is in a standby mode. With the active-active operational configuration, both of the actuators are simultaneously powered. This latter operational configuration provides certain advantages over the active-standby configuration. Specifically, the active-active approach allows each individual actuator to be sized relatively smaller as compared to the actuators used to implement the active-standby configuration. Additionally, redundancy management becomes simpler. It is noted, however, that the active-active operational mode does present the potential for a resultant force-fight between the active actuators.

Electro-Hydraulic Servo-Valves (EHSVs) are very high pressure gain devices. When two hydraulic actuators are rigidly connected together, as in a redundant actuator, and operated simultaneously by independent electronic channels, a very small mismatch in command can create full force fight between the two actuators. The force-fight results from the fact that the actuators, position sensors, control electronics, and mechanical components have independent, unique tolerances. In the case of side by side hydraulic stages, the resultant effect of force fighting is severe bending in both piston rods, creating a racking effect in the actuator, which can accelerate structural fatigue and bearing wear. Designing a redundant actuator to withstand the worst-case wear and fatigue that could occur in the active-active operational configuration would result in additional weight, and associated costs.

SUMMARY

A device and method in accordance with the present disclosure minimize or eliminate the effects of force-fight within a redundant actuator. For example, the racking effect in rod-piston hydraulic cylinders can be reduced or eliminated and, therefore, each piston-rod assembly mainly sees axial loads. As a result, a bending action into the piston-rod assembly, which can throw the moment over to the piston and thus side-load the piston, is minimized or eliminated.

According to one aspect of the invention, an actuation system for resolving the effects of force-fight between multiple stages within an actuator coupled to an aircraft flight control member includes: a yoke configured for connection to the flight control member; a first actuator operatively coupled to the yoke; a second actuator and a third actuator operatively coupled to the yoke, the second and third actuators symmetrically arranged on opposite sides of the first actuator; a first control member operatively coupled to the first actuator; and a second control member operatively coupled to the second actuator and the third actuator, the second control member configured to operate independent of the first control member.

In one embodiment, the actuation system includes: a first controller operatively coupled to the first control member and configured to control the first control member to position the first actuator; and a second controller operatively coupled to the second control member and configured to control the second control member to position the second and third actuators.

In one embodiment, the actuation system includes a master controller operatively coupled to the first controller and the second controller, the master controller configured to coordinate operation of the first and second controllers to effect motion of the flight control surface.

In one embodiment, the second actuator and the third actuator are connected in parallel to the second control member.

In one embodiment, the first and second control members comprise at least one of a hydraulic valve or an electrical power module.

In one embodiment, the first, second and third actuators comprise at least one of a hydraulic actuator or an electrical actuator.

In one embodiment, the yoke is integrally formed with the flight control member, and each actuator is pivotably connected to the yoke.

In one embodiment, the yoke is pivotably connected to the flight control member.

In one embodiment, the first, second and third actuators are configured to output a first, second and third force, respectively, and wherein the force output by the first actuator is substantially the same as the force output by a combination of the second and third actuators.

In one embodiment, the yoke comprises first, second and third connection portions for connection to the first, second and third actuators, respectively, and a fourth connection portion for connection to the flight control member, and, wherein the first connection portion and the fourth connection portion lie on a common axis.

In one embodiment, the second connection portion is separated from the third connection portion by the first connection portion.

In one embodiment, the second and third connection portions are symmetrically arranged on opposite sides of the first connection portion.

In one embodiment, the actuation system includes a fifth connection portion coupled to the first, second and third actuators, the fifth connection portion arranged on a side of the respective actuators distal from the fourth connection portion and configured to secure the respective actuators to a support structure positionally fixed relative to the flight control member.

In one embodiment, at least one of the fourth connection portion or the fifth connection portion comprises a mechanical articulating joint.

In one embodiment, the flight control member comprises a flight surface, a swashplate, or a thrust vector control device.

In one embodiment, the yoke comprises a T-shape member.

According to another aspect of the invention, a method for mitigating force-fight between multiple stages within an actuator controlling a flight control surface includes: providing a yoke for connection to the flight control surface; connecting a first actuator to the yoke; connecting a second actuator and a third actuator to the yoke, the second and third actuators symmetrically arranged on opposite sides of the first actuator; and controlling the first actuator independent of the second and third actuators.

In one embodiment, the method includes using at least one of a hydraulic actuator or an electrical actuator as the first, second and third actuators.

In one embodiment, coupling the first actuator includes using an actuator that outputs a first force, and coupling the second and third actuators includes using actuators that output a second and third force, respectively, wherein the first force is greater than each of the second and third force.

In one embodiment, coupling the first, second and third actuator between the support member and the yoke includes coupling the first actuator to a first location on the yoke, coupling the second actuator to a second location on the yoke, and coupling the third actuator to a third location on the yoke, wherein the second location and the third location are symmetrically arranged on opposite sides of the first location.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Embodiments in accordance with the present disclosure will now be described in further detail with reference to the accompanying drawings.

DETAILED DESCRIPTION OF THE DRAWING

Inventive features in accordance with the present disclosure will now be described in the context of flight surfaces for an aircraft. It should be appreciated, however, that the inventive features may be applied to other applications in which redundant actuators are implemented. Such applications include, for example, control of helicopter swashplates and thrust vector control in missiles.

In accordance with the present disclosure, an aircraft actuation system and method resolve the effects of force within a hydraulically redundant actuator. More particularly, first, second and third actuators are coupled to a common yoke, which in turn is connected to the flight control member. The second and third actuators are symmetrically arranged on opposite sides of the first actuator, and such arrangement provides that the yoke connection points for the second and third actuators are also symmetrically arranged on opposite sides of the yoke connection point for the first actuator.

In operation, the first actuator is controlled independent of the second and third actuators. For example, the first actuator may be controlled via a first hydraulic stage, and the second and third actuators may be controlled via a second hydraulic stage independent of the first hydraulic stage. An advantage of such configuration is that the actuators see only axial loads. In contrast, conventional systems having two side-by-side actuators that are independently controlled from one another experience side loads on the actuators, which is undesirable.

Figure 1:
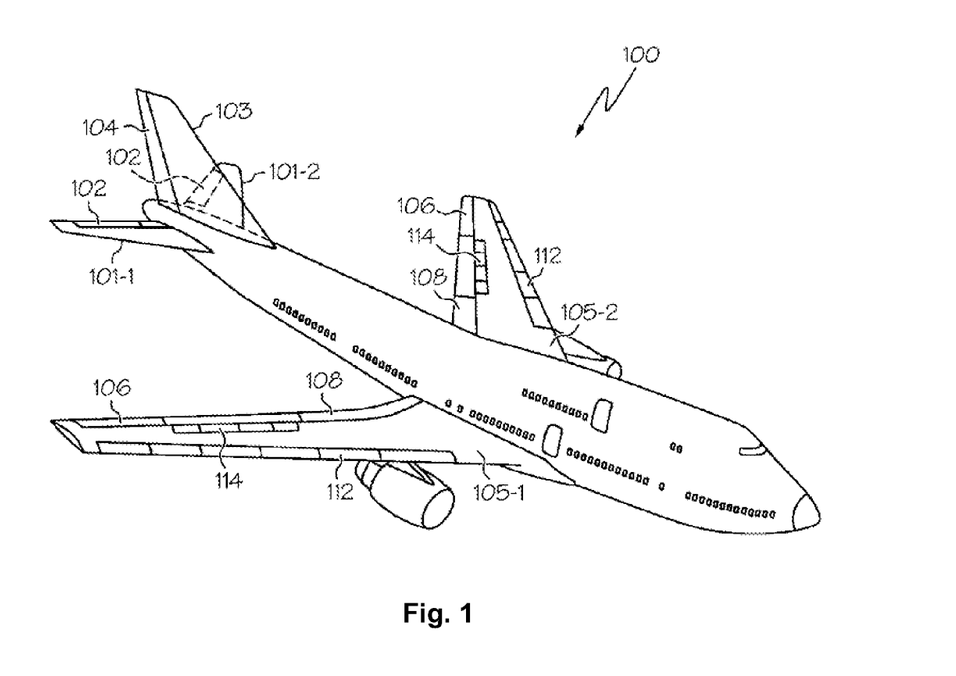
FIG. 1 is a plan view of an exemplary aircraft depicting primary and secondary flight control surfaces.

Referring now to the drawings, and initially to FIG. 1, a perspective view of an exemplary aircraft is shown. In the illustrated embodiment, the aircraft 100 includes first and second horizontal stabilizers 101-1 and 101-2, respectively, a vertical stabilizer 103, and first and second wings 105-1 and 105-2, respectively. An elevator 102 is disposed on each horizontal stabilizer 101-1, 101-2, a rudder 104 is disposed on the vertical stabilizer 103, and an aileron 106 is disposed on each wing 105-1, 105-2. In addition, a plurality of flaps 108, slats 112, and spoilers 114 are disposed on each wing 105-1, 105-2. The elevators 102, the rudder 104, and the ailerons 106 are typically referred to as the primary flight control surfaces, and the flaps 108, the slats 112, and the spoilers 114 are typically referred to as the secondary flight control surfaces. Portions of the wings and stabilizers that are not primary or secondary flight control surfaces are referred to herein as a first surface, and the primary and secondary flight control surfaces are referred to herein as second surface.

The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved by varying the thrust levels from the engines on opposing sides of the aircraft 100.

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend more steeply for a given airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

Figure 2:
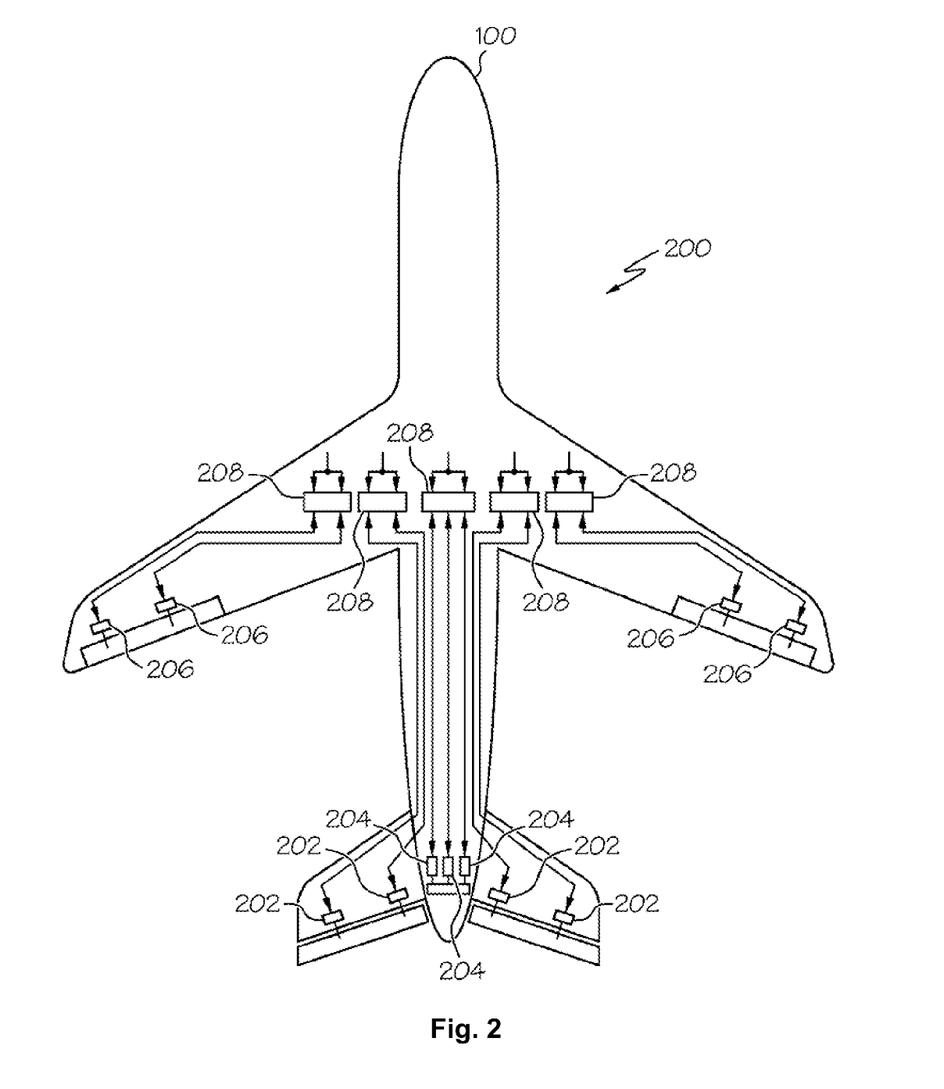
FIG. 2 is a schematic diagram depicting portions of an exemplary flight control surface actuation system.

The flight control surfaces 102-114 are moved to commanded positions via a flight control surface actuation system 200, an exemplary embodiment of which is shown in FIG. 2. In the depicted embodiment, the flight control surface actuation system 200 includes a plurality of primary flight control surface actuator assemblies, which include elevator actuator assemblies 202, rudder actuator assemblies 204, and aileron actuator assemblies 206, and a plurality of controls 208.

Before proceeding further, it is noted that the flight control surface actuation system 200 may additionally include a plurality of secondary control surface actuator assemblies, such as flap actuator assemblies, slat actuator assemblies, and spoiler actuator assemblies. However, the operation of the secondary flight control surfaces 108-114 and the associated actuator assemblies is not needed to fully describe and enable the present invention. Thus, for added clarity, ease of description, and ease of illustration, the secondary flight control surfaces and actuator assemblies are not depicted in FIG. 2, nor are these devices further described.

Returning now to FIG. 2, it will be appreciated that the flight control surface actuation system 200 may be implemented using various numbers of primary flight control surface actuator assemblies 202-206. In addition, the number of primary flight control surface actuator assemblies 202-206 per primary flight control surface 102-106 may be varied. In the depicted embodiment, however, the flight control surface actuation system 200 is implemented such that two primary flight control surface actuator assemblies 202 are coupled to each elevator 102, three primary flight control surface actuator assemblies 204 are coupled to the rudder 104, and two primary flight control surface actuator assemblies 206 are coupled to each the aileron 106. Each primary flight control surface actuator is implemented using an electro-hydraulic actuator assembly 202-206, although other types may be employed (e.g., electric motor actuator assemblies). It will be appreciated that this number of primary flight control surface actuator assemblies 202-206 is merely exemplary of a particular embodiment, and that other numbers of actuator assemblies 202-206 could also be used.

Instead of using multiple actuator assemblies for each flight control surface, a multi-stage actuator assembly may be used in place of the multiple actuators. For example, a single two-stage actuator assembly may be used on the ailerons 106 and elevators 102, while a single three-stage actuator assembly may be used on the rudder 104.

The flight control surface actuation system 200 may also be implemented with various numbers of controls 208. However, the flight control surface actuation system 200 is preferably implemented such that the primary flight control surface actuator assemblies 202-206 that are coupled to a common flight control surface 102-106 are controlled by a redundant controller. It will be appreciated that, although the controls 208 are depicted as being disposed remote from the associated actuator assemblies 202-206, some or all of the actuator controls 208 could be collocated or integral with the associated actuator assemblies 202-206.

No matter its specific implementation, each control 208 is preferably configured, during normal system operation to operate in an active-active mode. Thus, each control 208 is configured to receive flight control surface position commands from one or more external systems, such as one or more pilot controls. In response to the flight control surface position commands, each actuator control 208 appropriately controls its associated plurality of flight control surface actuator assemblies 202-206 to supply a force to its associated flight control surface 102-106 that moves the associated flight control surface 102-106 to the commanded position.

Figure 3:
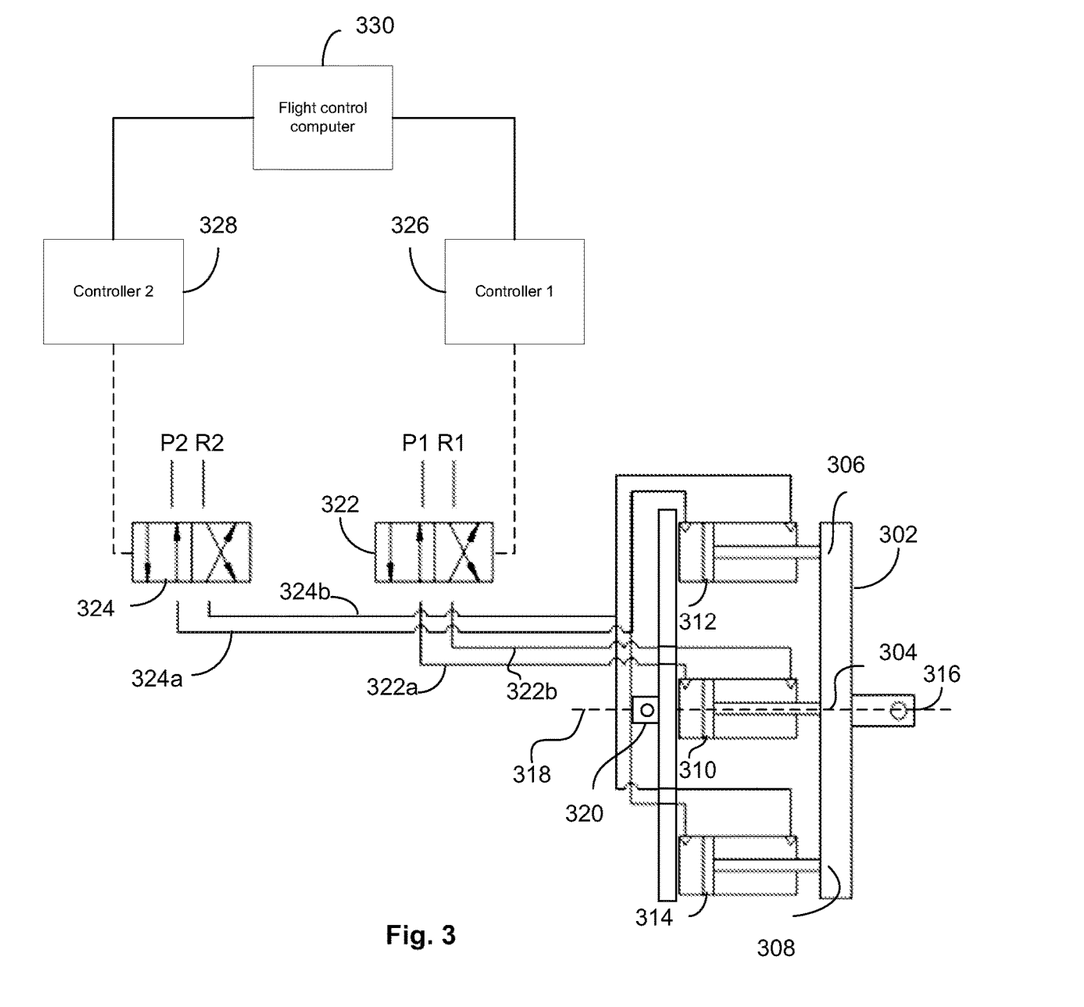
FIG. 3 is a schematic diagram illustrating an exemplary actuator system in accordance with the present disclosure for minimizing the effects of force-fight between actuator stages on a flight control member.

Referring now to FIG. 3, an exemplary actuation system 300 in accordance with the present disclosure for minimizing or eliminating the effects caused by force-fight within a hydraulically redundant actuator is illustrated. FIG. 3 schematically illustrates the inter-connection between components. The illustrated system 300 includes a control portion 300a (which may be used as the controls 208 in FIG. 2) and an actuator portion 300b (which may be used as any of actuator assemblies 202, 204, 206, etc. in FIG. 2) for operating the flight control surface as described above.

The actuation system 300 of FIG. 3 is shown in the context of an electro-hydraulic actuation system. It should be appreciated, however, that aspects of the invention are applicable to other types of actuators and reference to a hydraulic system is merely exemplary. For example, instead of a hydraulic system an electrical system utilizing electric motors may be employed.

The actuation system 300 includes yoke 302 for connection to a flight control member, such as a flight control surface (e.g., for control of an airplane), a swashplate (e.g., for control of a helicopter), a thrust vector control device (e.g., for control of a missile), etc. The yoke 302 includes a first connection portion 304, second connection portion 306 and third connection portion 308 for connection to a first actuator 310, second actuator 312 and third actuator 314, respectively. The second and third actuators 312 and 314 are symmetrically arranged on opposite sides of the first actuator 310. Thus, the second and third connection portions 306 and 308 are also symmetrically arranged on the yoke 302 on opposite sides of the first connection portion 304, resulting in the second connection portion 306 being separated from the third connection portion 308 by the first connection portion 304.

The yoke 302 may also include a fourth connection portion 316 for connection to the flight control member. Preferably, the first connection portion 304 and the fourth connection portion 316 lie on a common axis 318. In one embodiment each actuator is connected to the yoke 302, and the yoke 302 is pivotably connected to the flight control member via the fourth connection portion 316. In another embodiment, the yoke 302 is integrally formed with the flight control member and each actuator is pivotably connected to the yoke 302.

A fifth connection portion 320 is coupled to the first, second and third actuators 310-314, the fifth connection portion arranged on a side of the respective actuators distal from the fourth connection portion 316. The fifth connection portion 320 provides a means for securing the respective actuators to a support structure (not shown) that is positionally fixed relative to the aircraft. In one embodiment, at least one of the fourth connection portion 316 or the fifth connection portion 320 comprises a pivotable joint, such as a mechanical articulating joint.

As noted above, in the embodiment shown in FIG. 3 the first, second and third actuators are hydraulic actuators (e.g., cylinder-type "piston-rod" hydraulic actuators), although other actuators, such as electrical actuators (e.g., electric motors) may be utilized without departing from the scope of the invention. Preferably, the first, second and third actuators 310, 312 and 314 are configured to output a first, second and third force, respectively, the force output by the first actuator 310 being substantially the same as the force output by a combination of the second and third actuators 312 and 314.

A first control member 322 is coupled to a first hydraulic stage having a pressure line P1 and a return line R1, the first control member 322 being in fluid communication with a fluid chamber of the first actuator 310 via conduits 322a and 322b. The first control member 322 is operative to selectively and proportionally provide fluid power to the first actuator 310 to effect motion thereof. A second control member 324 is coupled to a second hydraulic stage different from the first hydraulic stage and having a pressure line P2 and a return line R2, the second control member 324 being mechanically independent from the first control member 322. The second control member 324 is in fluid communication with a fluid chamber of both the second and third actuators 312 and 314 via conduits 324a and 324b, and is operative to selectively and proportionally provide fluid power to the second and third actuators 312 and 314 to effect motion of the respective actuators. In the embodiment shown in FIG. 3 the second actuator 312 and the third actuator 314 are connected in parallel to the second control member 324.

In one embodiment, the first and second control members 322 and 324 are electrically-operated hydraulic valves (e.g., servo valves). In another embodiment that employs electric motors as the actuators, the first and second control members 322 and 324 are electric controllers such as a motor power controller or a servo motor controller.

Operatively coupled to the first control member 322 is a first controller 326, and operatively coupled to the second control member 324 is a second controller 328. The first and second controllers 326 and 328, which may include a processor, memory and logic stored in memory and executable by the processor, control the respective control members 322 and 324 so as to position the respective actuators.

For example, the respective controllers 326 and 328 may control the control members 322 and 324 to position the actuators 310, 312 and 314 (and thus the flight control member coupled thereto) to a location corresponding to a received input. A master controller 330, such as a flight control computer or the like, is operatively coupled to the first and second controllers 326 and 328 to provide such input to the respective controllers. The master controller 330 may receive flight commands from a pilot (e.g., via a flight stick) or generate commands on its own (e.g., auto pilot), and based thereon generate commands for each of the controllers 326 and 328 to control the actuators 310-314 to achieve a desired flight characteristic.

The actuation system in accordance with the present disclosure provides a superior load path relative to conventional side-by-side actuators utilizing mechanically independent control members. More particularly, in conventional side-by-side systems force fighting creates a bending moment reacted entirely by the piston rods, which can cause failure and/or require extra material weight in the flight control member to sustain the bending moment. With the symmetrically arranged actuator system in accordance with the present disclosure, force fighting is mainly reacted within the common yoke and does not significantly affect the piston rods, thus reducing the chance of failure and requiring less material weight to sustain.

Figure 4:
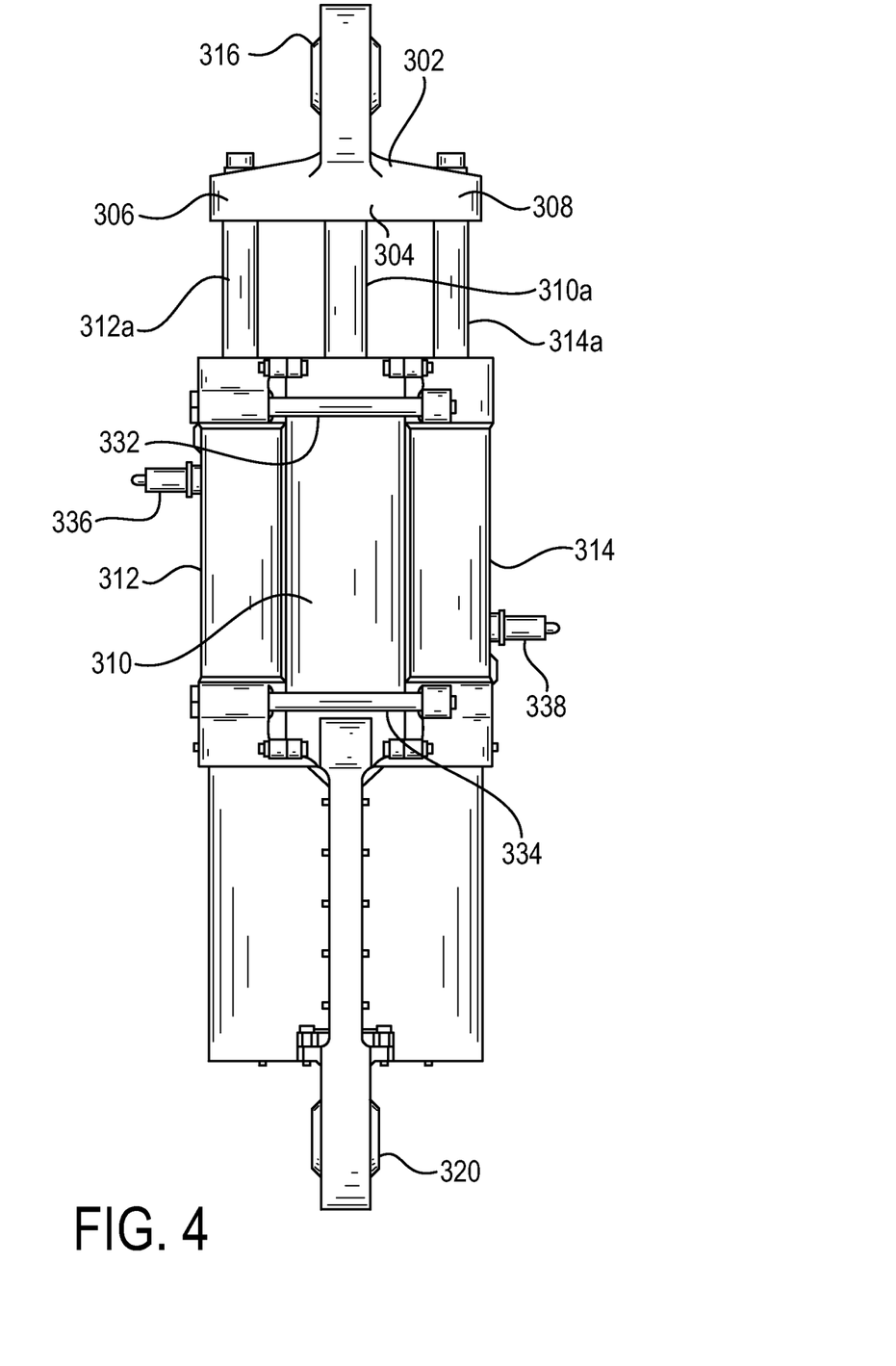
FIG. 4 is a side view of an exemplary actuator assembly in accordance with the present disclosure.

Referring now to FIG. 4, an exemplary hydraulic actuator assembly in accordance with the present disclosure is illustrated. The actuator assembly includes a yoke 302 in the shape of a T-bracket having a first connection portion 304, a second connecting portion 306 and a third connecting portion 308 for connection to respective actuators 310, 312 and 314, which in the present example are hydraulic actuators. A fourth connection portion 316 in the form of an eyelet lies on the same axis as the first connecting portion 304, the fourth connecting portion connectable to a flight control member.

As can be seen in FIG. 4, the second and third actuators 312 and 314 are symmetrically arranged on opposite sides of the first actuator 310. First, second and third rods 310a, 312a and 314a of the first, second and third actuators 310, 312 and 314, respectively, are connected to the yoke at the first, second and third connecting portions 304, 306 and 308, respectively. The connection, for example, may be via a threaded fastener or the like.

The second and third actuators 312 and 314 are fluidly connected in parallel to each other. In this regard, a first conduit 332 couples the rod-side of each actuator's hydraulic chamber, while a second conduit 334 couples the piston-side of each actuator's hydraulic chamber. A rod-side fluid connector 336 provides a means for providing hydraulic fluid to the rod-side of each actuator 312 and 314, while a piston-side fluid connector 338 provides a means for providing hydraulic fluid to the piston side of each actuator 312 and 314. Although not shown in FIG. 4, rod-side and piston-side connections are also provided to the first actuator 310.

A fifth connection portion 320 is coupled to a side of each actuator distal from the yoke 302. The fifth connection portion 320 enables the actuator assembly to be connected to a support member, such as a support member that is positionally fixed relative to the aircraft.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. An actuation system for resolving the effects of force-fight between multiple stages within an actuator assembly coupled to an aircraft flight control member, comprising:
   a yoke configured for connection to the flight control member;
   a first actuator operatively coupled to the yoke;
   a second actuator and a third actuator operatively coupled to the yoke, the second and third actuators symmetrically arranged on opposite sides of the first actuator;
   a first control member having a first control output operatively coupled to the first actuator, wherein the first control member is configured to cause the first actuator to output a first force to the yoke; and
   a second control member having a second control output operatively coupled to both the second actuator and the third actuator to provide a same command to both the second actuator and third actuator, the second control member configured to operate independent of the first control member, wherein the second control member and the third control member are configured to cause the second actuator and third actuator to output a second force to the yoke and a third force to the yoke respectively, wherein a combined force comprising the second force and the third force is substantially the same as the first force.

2. The actuation system according to claim 1, further comprising:
   a first controller operatively coupled to the first control member and configured to control the first control member to position the first actuator; and
   a second controller operatively coupled to the second control member and configured to control the second control member to position the second and third actuators.

3. The actuation system according to claim 2, further comprising a master controller operatively coupled to the first controller and the second controller, the master controller configured to coordinate operation of the first and second controllers to effect motion of the flight control surface.

4. The actuation system according to claim 1, wherein the second actuator and the third actuator are connected in parallel with each other, the parallel connection of the second actuator and the third actuator being connected to the second control member.

5. The actuation system according to claim 1, wherein the first and second control members comprise at least one of a hydraulic valve or an electrical power module.

6. The actuation system according to claim 1, wherein the first, second and third actuators comprise at least one of a hydraulic actuator or an electrical actuator.

7. The actuation system according to claim 1, wherein the yoke is integrally formed with the flight control member, and each actuator is pivotably connected to the yoke.

8. The actuation system according to claim 1, wherein the yoke is pivotably connected to the flight control member.

9. The actuation system according to claim 1, wherein the first, second and third actuators are configured to output a first, second and third force, respectively, and wherein the force output by the first actuator is substantially the same as the force output by a combination of the second and third actuators.

10. The actuation system according to claim 1, wherein the yoke comprises first, second and third connection portions for connection to the first, second and third actuators, respectively, and a fourth connection portion for connection to the flight control member, and, wherein the first connection portion and the fourth connection portion lie on a common axis.

11. The actuation system according to claim 10, wherein the second connection portion is separated from the third connection portion by the first connection portion.

12. The actuation system according to claim 11, wherein the second and third connection portions are symmetrically arranged on opposite sides of the first connection portion.

13. The actuation system according to claim 10, further comprising a fifth connection portion coupled to the first, second and third actuators, the fifth connection portion arranged on a side of the first, second and third actuators distal from the fourth connection portion and configured to secure the first, second and third actuators to a support structure positionally fixed relative to the flight control member.

14. The actuation system according to claim 13, wherein at least one of the fourth connection portion or the fifth connection portion comprises a mechanical articulating joint.

15. The actuation system according to claim 1, wherein the flight control member comprises a flight surface, a swashplate, or a thrust vector control device.

16. The actuation system according to claim 1, wherein the yoke comprises a T-shape member.

17. A method for mitigating force-fight between multiple stages within an actuator assembly controlling a flight control surface, comprising:
   providing a yoke for connection to the flight control surface;
   connecting a first actuator to the yoke;
   connecting a second actuator and a third actuator to the yoke, the second and third actuators symmetrically arranged on opposite sides of the first actuator;
   controlling the first actuator to output a first force on the yoke independent of the second and third actuators; and
   controlling the second and third actuators via a common control signal to output a combined force on the yoke substantially the same as the first force on the yoke.

18. The method according to claim 17, further comprising using at least one of a hydraulic actuator or an electrical actuator as the first, second and third actuators.

19. The method according to claim 17, wherein connecting the first actuator includes connecting the first actuator that outputs a first force, and connecting the second and third actuators includes connecting second and third actuators that output a second and third force, respectively, wherein the first force is greater than each of the second force and the third force.

20. The method according to claim 17, wherein connecting the first, second and third actuator between the yoke includes connecting the first actuator to a first location on the yoke, connecting the second actuator to a second location on the yoke, and connecting the third actuator to a third location on the yoke, wherein the second location and the third location are symmetrically arranged on opposite sides of the first location.

21. A method for mitigating force-fight between multiple stages within an actuator assembly that controls a flight control surface, wherein first, second and third actuators are each connected to a yoke coupled to the flight control surface, the second and third actuators symmetrically arranged on opposite sides of the first actuator, the method comprising:
   outputting, by the first actuator, a first force on the yoke independent of the second and third actuators; and
   outputting, by the second and third actuators via a common control signal a combined force on the yoke equal to the first force.

* * * * *